Feb. 2, 1954   D. E. HOOKER ET AL   2,668,261
FOLLOWER AND HOMING SWITCH CONTROL MEANS
Filed March 20, 1950   5 Sheets-Sheet 1

Fig.1

Inventors
Donald E. Hooker
Frank G. Nicolaus
By Ballard Livingston
Attorney

Feb. 2, 1954   D. E. HOOKER ET AL   2,668,261
FOLLOWER AND HOMING SWITCH CONTROL MEANS
Filed March 20, 1950   5 Sheets-Sheet 3

Inventors
Donald E. Hooker
Frank G. Nicolaus
By Callard Livingston
Attorney Feb. 2, 1954          D. E. HOOKER ET AL          2,668,261

FOLLOWER AND HOMING SWITCH CONTROL MEANS

Filed March 20, 1950                          5 Sheets—Sheet 4

Inventors
Donald E. Hooker
Frank G. Nicolaus
By Ballard Livingston
Attorney

Patented Feb. 2, 1954

2,668,261

UNITED STATES PATENT OFFICE 2,668,261

FOLLOWER AND HOMING SWITCH CONTROL MEANS

Donald E. Hooker, Skokie, and Frank G. Nicolaus, Chicago, Ill., assignors to Raymond T. Moloney, Chicago, Ill.

Application March 20, 1950, Serial No. 150,612

18 Claims. (Cl. 317—157)

This invention has as its principal object the provision of electrical switching means and circuits of general application and particularly useful in conjunction with score-indicating and tallying apparatus in amusement devices and the like.

One of the more detailed objects is the provision of a follower switch which is operative to test a circuit for the existence of certain conditions, and automatically readjust itself and certain appurtenant circuits, depending upon which condition is found to exist, to set up control circuits or circuits according to a predetermined pattern, all in a manner to eliminate a large amount of equipment, particularly holding relays, which would otherwise be required in the absence of the services of the follower switch.

Another object is the provision of a cyclically operable follower switch including a master stepping unit and a coacting follower unit which follows the stepping unit at certain times in each cycle of operation, the master and follower units being mutually dependent and functioning to set up different sub-circuits in accordance with the existence of one or another predetermined condition in a principal circuit.

Another object is the provision of a follower switch including a rotary stepping master switch, a stepping mechanism and a resetting mechanism therefor, and a follower switch including oppositely rotatable positioning members or levers either of which is advanced in opposite directions by corresponding movement of the master switch, a follower wiper normally tending to follow the master switch but restrained by one of the positioning levers, and an indexing device which is released to cause the follower wiper to assume successive following positions corresponding to advances of the master switch.

Yet another object is the provision of cycling controls cooperable with the follower switch and appurtenant circuits for resetting the master switch, variously stepping the master switch for repositioning purposes, and then indexing the follower to set up control circuits in accordance with the existence of any of a predetermined number of conditions, each of which results in a different pattern of operation of the follower switch depending upon which condition exists during any given operating cycle thereof.

Additional objects and aspects of novelty and utility characteristic of the invention pertain to details of the construction, operation, and circuits and devices hereinafter described in view of the annexed drawings, in which:

Figure 1:
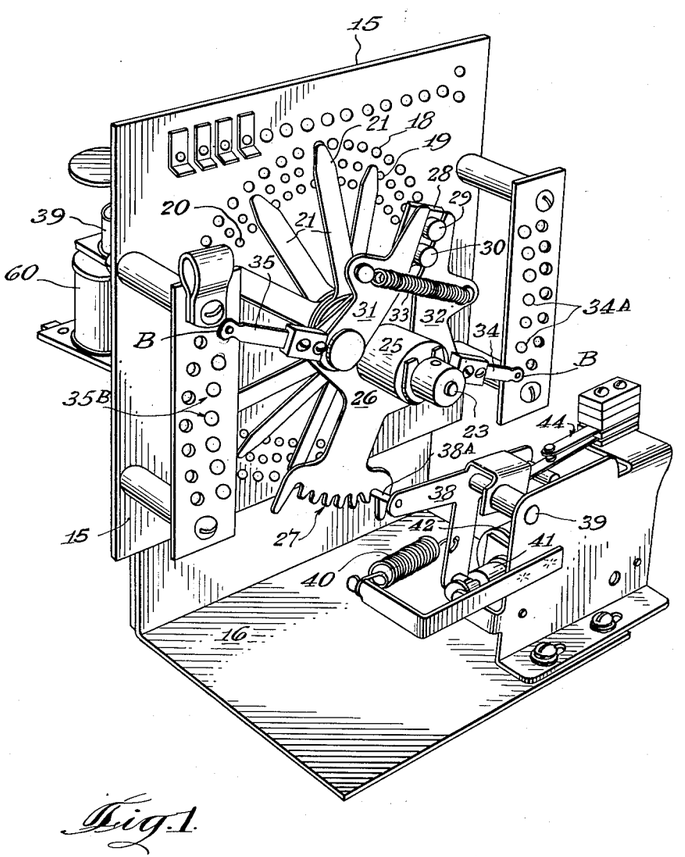
Fig. 1 is a perspective view of the follower switch looking at the follower and indexing mechanism.
Figure 4:
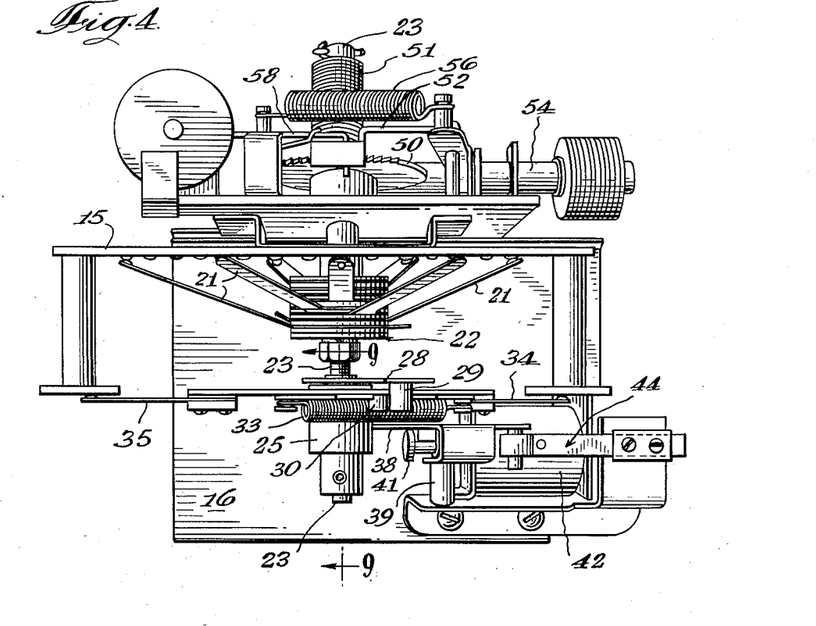
Fig. 4 is a top view of the follower switch unit.

In its structural details, the follower switch, as shown in Fig. 1, includes a contact panel 15 mounted on a base plate 16 and having a plurality of groups of contacts 18, 19, and 20 arranged in concentric circles to be engaged respectively by a plurality of spring contact fingers or wipers 21, all carried on an insulated hub member (Fig. 4) 22 fast on a stepping shaft 23.

Figure 9:
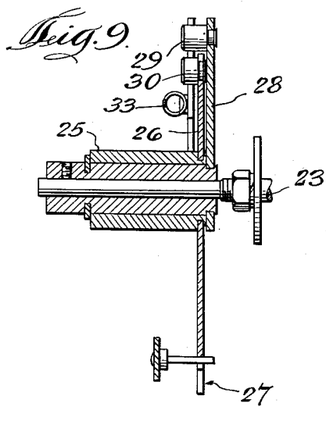
Fig. 9 is a sectional fragment taken along lines 9—9 of Fig. 4.

Floating on shaft 23 is a follower hub 25 fixed to an index lever 26 having a radial indexing extension provided with indexing teeth 27. A radial positioning lever 28, fast on shaft 23, is provided with a positioning stud 29, which, in normally reset condition, is radially aligned with a follower stud 30 carried on the follower index lever 26 (see Figs. 5, 6, 9, also).

Figure 5:
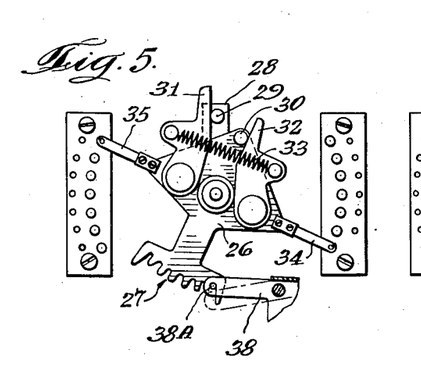
Fig. 5 is an elevational detail in an advanced switching condition preparatory to indexing.
Figure 6:
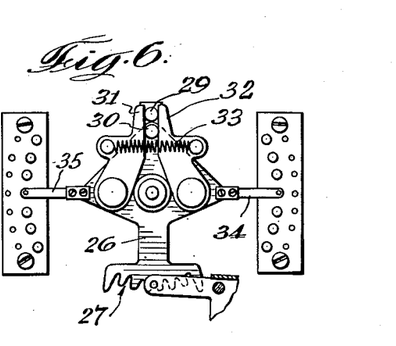
Fig. 6 is a detail similar to Fig. 5 but showing the following mechanism indexed to a homing position.
Figure 7:
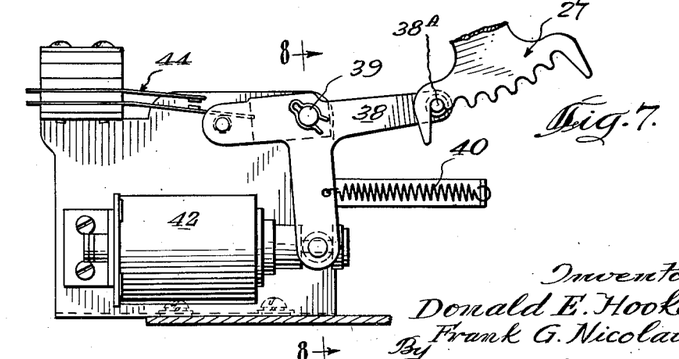
Fig. 7 is an elevational detail of the indexing mechanism in starting or reset condition.

As depicted to better advantage in Figs. 5 and 6, there are two positioning pawls 31 and 32 pivoted on the index lever, and urged toward each other by a spring 33.

Also carried on the index lever are oppositely diverging wiper contacts 34 and 35, each engageable with a corresponding bank of A or B follower contacts designated 34A and 35B.

Figure 2:
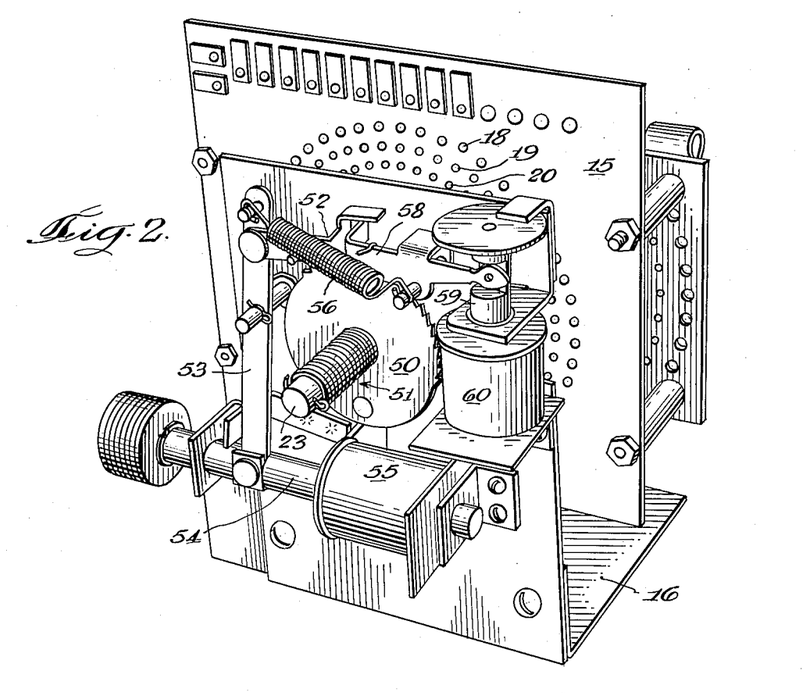
Fig. 2 is a perspective view of the opposed side of the follower switch looking at the stepping and resetting ratchet mechanism.
Figure 3:
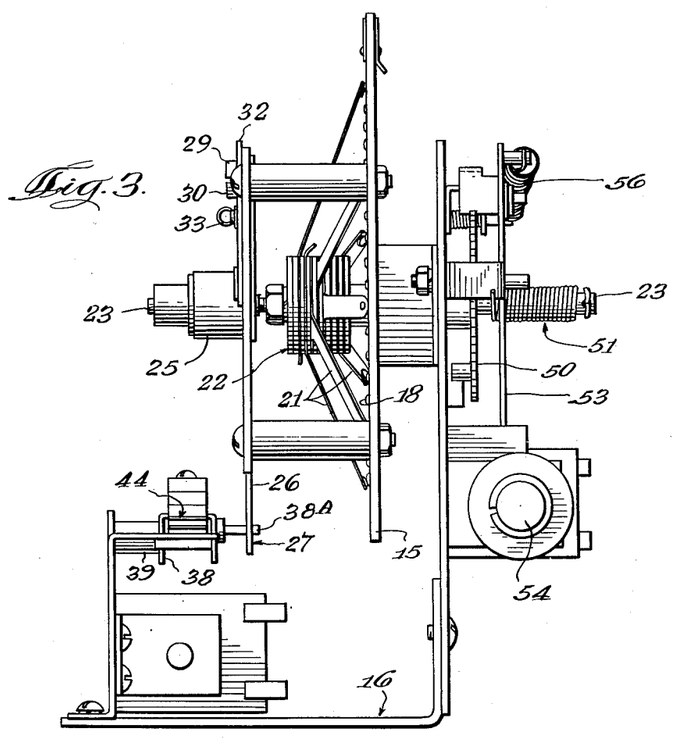
Fig. 3 is a side elevation of the follower switch.

Means for actuating the master switch, to step and reset the same, is shown in Fig. 2, and comprises a ratchet disc 50 fast on shaft 23 and normalized (i. e. urged counterclockwise) by a spring 51.

A stepping pawl 52 is reciprocated by a lever 53 driven from plunger 54 of stepping solenoid 55 against the tension of spring 56.

The clockwise gain of the ratchet disc is held by a holding pawl 58, also normalized by spring 50, and released by solenoid plunger 59 when attracted by its coil 60.

Figure 8:
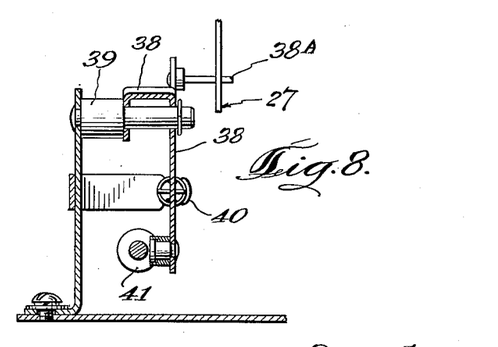
Fig. 8 is a sectional fragment along lines 8—8 of Fig. 7.

The indexing means shown in Fig. 1 includes a bell crank lever 38 (see also Fig. 8) pivoted on a plate as at 39, and rocked by a spring 40 and solenoid plunger 41 and its coil 42, to move indexing pin 38A in and out of the indexing teeth 27. A supervisory switch 44 is also actuated by rocking of lever 38.

In general, the wipers 21 and concentric contact banks 18, 19, and 20 comprise the master switch means, while the follower wipers 34 and 35 and their contact banks 34A and 35B comprise the follower switch means.

Thus, when stepping coil 55 is impulsed, lever and pawl means 53—52 steps the disc 50 clockwise, along with shaft 23.

As viewed in Fig. 1, this motion of shaft 23 becomes counter-clockwise, and all of the master switch wipers 21 are correspondingly displaced. Moreover, the positioning lever 28 likewise steps counter-clockwise, carrying its stud 29 against the positioning pawl 31 and separating the same to the advanced condition shown in Fig. 5, it being remembered that the index lever 26 floats on shaft 23 and is releasably held by index pin 38A, assuming that the master switch has been advanced as aforesaid to the condition corresponding to that shown for the follower mechanism in Fig. 5.

If now the index coil 42 is energized, pin 38A is withdrawn from teeth 27, and the tension in spring 33 (through pawl 32 against stud 30) will rotate the index lever 26 counter-clockwise until pawl 32 strikes home against stud 29, so that the follower wipers 34 and 35 now occupy the new homing position shown in Fig. 6.

Under the foregoing circumstances (i. e. the condition of Fig. 6), either or both of two things may be done to reset: The holding and reset coil 60 of Fig. 2 may be energized to free the ratchet disc 50 for return by spring 51 along with return of the master wipers; however, the index lever 26 would remain as shown in Fig. 6. Or, the reset coil 60 may be energized simultaneously with the index coil 42, in which case both the master switch wipers and the follower switch wipers are returned to normal or starting position.

From the foregoing, it will now appear that the follower switch, as a unit, consists essentially of a master stepping switch and a holding and resetting means therefor, and a follower switch and indexing and advance-positioning means therefor, all operable so that whenever the master switch is stepped to a new (off normal) position, the positioning pawls of the follower are conditioned to determine a new homing position for the follower switch wipers, and when the index means is actuated the follower wipers will turn home to the new position determined by the master switch. Subsequent operation of the reset means (by energization of the reset and index coils) will restore both the master and follower switches to starting or zero position.

Figure 10:
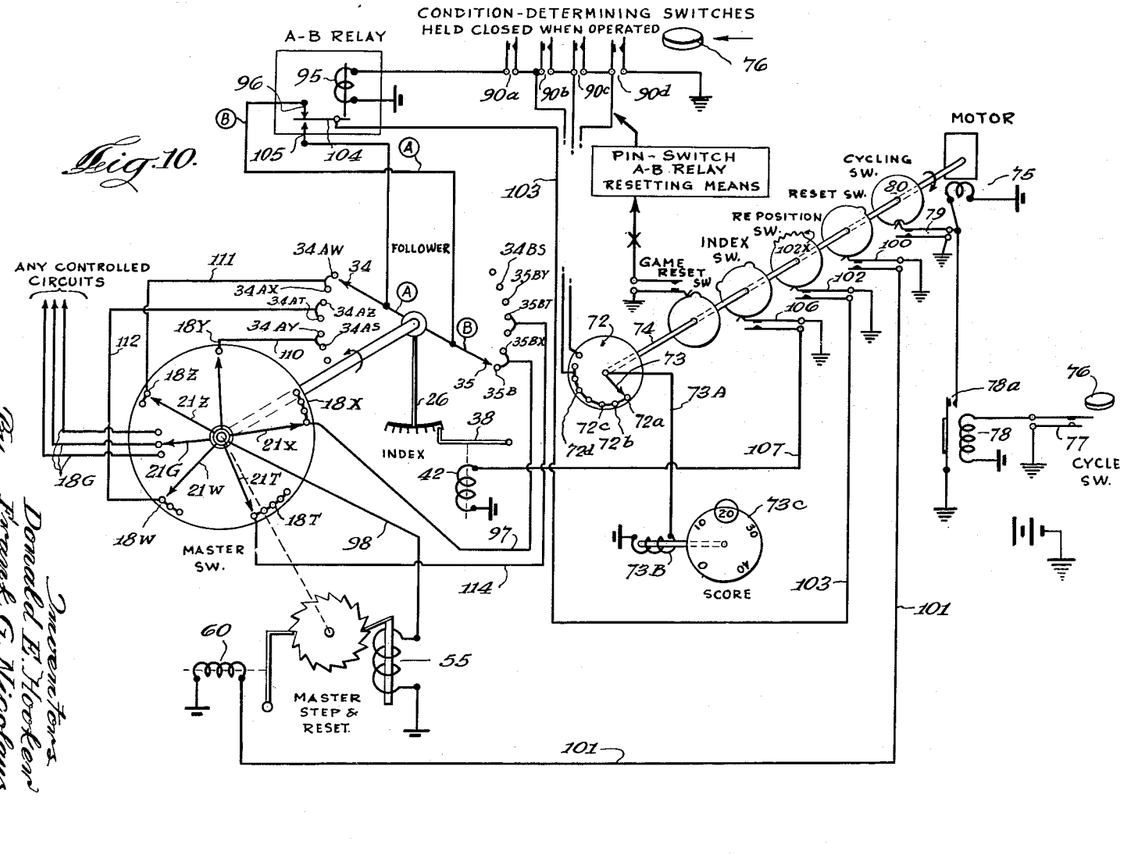
Fig. 10 is a schematic circuit and operating diagram.

In Fig. 10 is shown a schematic diagram of an illustrative circuit for actuating the follower switch dependently upon the existence of one or the other of two scoring conditions in an amusement game circuit, such as ten pins or a ball-rolling game. Stated otherwise, Fig. 10 is representative of the circuit of one embodiment of the follower unit, which includes not only the follower switch of Figs. 1 through 9, but also the cycling control and appurtenant circuits cooperative with the follower or homing switch, as it is also designated.

At the upper right of Fig. 10 is shown a cycling or timer-switch means including a common shaft 74 driven by timer motor 75 which may be impulsed momentarily by a starting switch 77 adapted to be closed by a returned playing piece 76, for instance a played puck or ball which is being gravitationally returned in the appurtenant game and which actuates the switch during its return travel.

Starting or tripping switch 77 actuates a relay 78 to momentarily energize the motor 75 through relay contacts 78a.

The motor rotates cam disc 80 sufficiently to close cam switch 79 and thereby continue the energization of motor 75 for the duration of one revolution of shaft 74, or until switch 79 is again opened by cam 80.

It may be observed that in the illustrative circuits all battery or power connections are understood returned to common or frame ground.

In consequence of the aforesaid revolution of shaft 74, a number of control circuits for the follower switch are set up for sequential effectuation, but the ensuing operations of the follower switch are, in this illustrative example, understood to be dependent upon the existence of one or another predetermined circuit condition in the appurtenant game circuits.

It is assumed for purposes of this illustration that the game in which the follower switch and control circuit are incorporated is a bowling game involving the use of ten pins, and that each of the ten pins is represented by a switch actuated by the playing piece, i. e. the puck 76.

Upon each throw of the puck, one of two predetermined or possible conditions may result, namely: either the player makes a "strike" getting all ten pins down in one shot; or he gets less than all ten pins down in one shot; these conditions are respectively referred to hereinafter as A or B conditions.

At the upper right of Fig. 10 are shown a plurality of "Game Switches" 99a, 99b, 99c, 99d. For a bowling game there would be ten such switches, each representative of one of the pins; and these switches in practice would be relay switches on latching type or holding relays, that is to say, when operated in scoring these switches would be held closed. It will be apparent to those skilled in the art that there may be any number of switches 99, in any analogous type of game.

FIRST EXAMPLE

*First play*

Assuming now that less than all game switches 99 are closed, and noting that said game switches are connected in series, the A—B relay coil 95 is not energized, as a result of which contact 96 to the B wiper 35 is in circuit with the master motor switch through the Group B contacts 35B; conductor 97 and four master switch contacts in group 18X.

It will further be observed that the master switch stepping coil 55 is included in this B circuit via master wiper contact 21X and conductor 98.

Now following closure, as aforesaid, of less than all game switches, the playing piece used, for example a puck 76, will be automatically (e. g. gravitationally) returned for subsequent or repeated use in playing the game in the manner common in such devices, and as a result, the returning puck will initiate a cycle of operation of the control unit by closing the cycling switch 77, thereby momentarily energizing motor relay 78 to close its contacts 78a and connect starting power to the cycling motor 75, which will rotate the common cam shaft 74 a distance sufficient to close a motor holding circuit through the timer cam switch 79 for one revolution.

During the first phase (about 136° of angular displacement of the timer shaft 74), a rotary wiper switch 72 is actuated to cause wiper contact 73 to pass over score contacts 72a, 72b, 72c, 72d, etc., and this wiper contact is connected to operate some known form of score control or indicator means; and in this example the wiper 73 is connected by conductor 73A to impulse stepping coil 73B to rotate a score number dial 73C.

Now, it being recalled at this stage of operation, that the cycling control unit shaft 74 has been started on one revolution of travel by the returning playing piece, and that the rotary scoring switch 72 has been operated as aforesaid during a portion of the revolution, the next thing to happen in the sequence is a resetting of the master switch by the resetting cam switch 100, which will pulse the reset coil 69 via conductor 101, causing the master switch wipers 21 (21X) to return to starting position from a previously advanced condition, if any. In Fig. 10, the master switch is shown at starting position.

Thereafter, the master switch is repositioned by closure of repositioning cam switch 102, which connects via conductor 103 to armature contact 104 on the A—B relay, thus completing a circuit via the B wiper 35, a follower contact 35B, conductor 97, master switch contacts 18X, wiper 21X, and conductor 98 to the master step up coil 55, and the latter can be pulsed a maximum of only five times (there are five teeth 102X for cam switch 102), and the pulsing switch will be ineffective in any event after wiper 21X leaves the last contact in master bank 18X to take its last (or fourth) step.

Following the aforesaid repositioning operation, the homing or indexing operation occurs by closure of indexing cam switch 106, which completes a power circuit via conductor 107 to index-coil 42, whereupon the index lever 26 is free to move wiper 35 home to contact 35BY, in the manner heretofore described, it being observed in this instance that contact 35BY is dead.

It should be observed that as a general thing, from the time the follower switch leaves its normal starting position, the number of steps to be taken in any subsequent operation of the master switch is under control of the follower switch, until the latter is again indexed back to normal at the beginning of each new game.

The player, having thrown a first puck in the first round or frame of play, and having failed to strike all pins (all pins switches 90), is entitled to another try for the remaining pins, hence the automatic pin "switch resetting means" does not operate. This condition, where the maximum score is not obtained (all conditioning or score switches not operated), is called the "B-Condition," the "A-Condition" being that in which all conditioning or score switches are operated.

*Second play*

Assuming now that the player throws a second puck and succeeds in closing the remaining game switches not closed in his previous shot, so that the A—B relay is now energized (from the series circuit through all pin switches 90) and trips out the relay contact 104 to engage contact 105, thus disconnecting the follower wiper B or 35, and connecting wiper A or 34 for control of subsequent movement of the master switch. This situation is illustrative of the "A Condition."

In this second phase of play the returning puck again triggers the cycling switch by closure of the starting switch 77, as before, and in sequence, the cam switches 100, 102, 106, are operated to reset the master switch, to reposition the master switch, and to index the follower.

This resetting returns all master switch wipers 21 to starting position (as shown in Fig. 10); and the attendant repositioning operation this time occurs under control of follower wiper A (34) which (from the previous indexing operation) is now resting on contact 34AY, connected via conductor 110 to a single-step contact 18Y on the master switch.

Under the latter condition of the follower switch, when the repositioning cam switch 102 is now operated at the end of this second play of the game, the master switch will be stepped only once, or until wiper 21Y leaves contact 18Y (and the remaining four switch pulses from cam teeth 102X will be dead); and when the follower switch is next indexed, the follower wipers A and B will drop back to within one step off-normal starting position, which will be understood from the fact that at this time the master switch is also one step off-normal (i. e. off contact 18Y); and accordingly follower wiper A (34) will be left resting on contact 34AX, while the B wiper will stand on contact 35BX.

At this juncture, the automatic pin switch and A—B relay resetting means is operated to reset all pin switches 90 to normally open condition, and the player may proceed to throw for the next frame.

*Third play*

Assuming a third play, the game switches and A—B relay are now reset for the next "frame," so that the A—B relay is again normalized, opening contacts 104—105, and closing contacts 96—104, thus restoring the "B Condition" and making follower wiper A dead and wiper B effective again.

The player now continues in an effort to make a "Strike" on all pins (i. e. close all game switches 90a . . . 90d) but it will be assumed that he fails to hit any pin or close any pin switch.

Under these conditions, the returning puck (or ball) will operate the switch 77 and start the cycling unit, as before; and the master switch will be reset, then repositioned or stepped through the pulsing or stepping cam switch 102; but this time, recalling that the follower switch wiper B (now hot) is still lodged or held one step off-normal on contact 35BX, the master switch will again take four steps under control of the B wiper on the follower switch.

As a result, when the follower is next indexed, wiper B will advance, actually only three steps, to lodge on dead contact 35BY, and this condition would be held for the next play.

SECOND EXAMPLE

*First play*

The entire follower unit is assumed to be zeroized or normalized, with the follower switch indexed to normal starting condition.

The player makes a "strike" and closes all of the pin switches 90, energizing the A—B relay, and setting up the "A Condition" at A—B relay contacts 104—105.

The cycling control switch means, 77, 79—80 cycles the control unit, as before; resetting the master switch (which now is at normal anyway); repositioning the master switch, which will now take two steps under control of wiper A on contact 34AW, conductor 111, master disc contacts 18Z, wiper 21Z, step-up coil 55, and the repositioning switch 102, conductor 103, and now-closed A—B relay contacts 104, 105, to wiper A.

When next the follower switch is indexed at the conclusion of the attendant cycling operation of the control unit, the wipers 34 and 35 will home to a new position two steps off normal, lodging follower wiper A (34) on contact 34AZ. Following any "strike" or complete scoring by closing all switches 90, the latter are reset automatically, and so is the A—B relay.

*Second play*

The follower switch remains in third position; wiper A stands on contact 34AZ; the player makes another strike, closing all switches 90 again and tripping the A—B relay so that wiper A again controls the stepping of the master switch.

The ensuing resetting and repositioning operations now cause the master switch to first move back to zero or normal, then step three times under control of repositioning impulse switch 102 via conductor 103, A—B relay contacts 104—105, wiper A standing in previously indexed condition on contact 34AZ, conductor 112 to the three contacts 18W on the master disc, and wiper 21W to stepping coil 55.

The ensuing indexing operation causes the follower switch to move to fourth position on contact 34AT:

Since a maximum score or "strike" was made, the pin switches 90 are reset again.

The game switches are all reset; "B Condition" exists (A—B reset); the follower switch stands at fourth position with wiper B on contact 35BT, which connects via conductor 114 to five contact buttons 18T on the master switch, completing a stepping or repositioning circuit via master wiper 21T to stepping coil 55.

*Third play*

Assume that the player closes less than all of the game or pin switches 90, "B Condition" remains in effect; as a result of the ensuing resetting and repositioning operations in the cycling phase, the master switch will now take five steps, and therefore the ensuing indexing operation will cause the follower switch to take only two more steps (since it already stands in fourth position), and this will lodge wipers A and B respectively on follower contacts 34AS and 35BS.

THIRD EXAMPLE

This example is intended to illustrate the situation where the follower switch drops back to first position from the last-described fifth position.

The pin switches are assumed to be reset; "B Condition" exists (A—B relay normal); the player scores all game switches closed thus changing to "A Condition" with wiper A standing, from previous indexing on contact 34AS (a single step contact); the master switch resets and repositions, as usual, this time taking only one step through wiper A (34), contact 34AS, conductor 110, single master contact 18Y, to the stepping coil 55 as impulsed by repositioning switch 102.

The ensuing indexing operation thus causes the follower to drop back from fifth position on contact 34AS to contact 34AX, because the master switch has stepped once from normal.

The foregoing examples are not intended to cover more than a few of the possible scoring situations in a bowling game, and to this extent the disclosure does not purport to present a complete score control and indicating circuit for such a game, but rather illustrates the operating and general circuit controlling characteristics of the follower switch per se, and the control unit of which it forms a part.

Accordingly, it will be understood that the aforesaid control unit may be utilized in many adaptations to games or any other application where a plurality of subcircuits are to be set up dependently upon the existence of any of several predetermined circuit conditions, such as the two A and B conditions described herein by way of example, with the object, among others, of eliminating equipment, such as holding relays, and simplifying, by reduction in numbers, and wiring for the subcircuits which would otherwise be involved.

In general, the follower switch unit, inclusive of the follower switch itself and the cooperative cycling or control means, provides a master switch which is positioned in accordance with the existence of one of several predetermined conditions (e. g. the A and B Conditions described) in an appurtenant circuit, and this positioning is shown in the foregoing examples to be a function of a cyclic or intermittent operation which is controlled in turn by some external agency such as the cycle initiating or starting switch means 77, which may also be a hand-operated switch or desired circuit-closing means.

In effect, the follower switch may be said to tell the master switch to what position it is to go, dependently upon which of the predetermined control circuit conditions A or B exists during any operating cycle.

It is also to be understood that the master switch, as by additional wipers 21G and additional contacts 18G can provide for control of any desired circuits.

The range of the follower switch may be increased simply by adding contacts in the follower contact banks 34A—35B, and/or wipers like 34 and 35, as will be apparent to those skilled in the art.

We claim:

1. A follower switch comprising a rotary master switch and means for rotating same, a follower switch adapted to turn co-directionally with the master switch; positioning means moved angularly by the master switch, means yieldingly urging said follower switch to follow movements of the master switch to positions determined by locations of said positioning means, and releasable indexing means normally restraining following movements of the follower switch and releasable to free said follower switch to follow the master switch to any of a plurality of following positions determined by said positioning means and to hold said following switch releasably in said following positions.

2. A follower switch including a master switch having a rotatable contactor, positioning means rotatably positioned with said contactor, a follower contactor rotatable coaxially of said master contactor to assume any of a plurality of indexed following positions, means providing a yieldable driving connection between said contactors, releasable indexing means normally restraining following movement of said follower contactor and cooperable therewith to hold the same in any of said indexed positions, and means operable to turn said master contactor in opposite directions, said positioning means limiting the following movements of the follower switch in indexed movements of the latter as aforesaid.

3. A follower and homing switch comprising a rotary stepping master switch and means for stepping same in opposite directions, a rotary follower switch having yieldable driving coupling with the master switch and tending to follow the latter, indexing means releasably holding the follower switch against the following movement from any of a plurality of indexed homing positions, and follower-positioning means actuated by the master switch in rotary displacement thereof for determining the homing positions to be occupied by the follower switch responsive to release thereby of said indexing means.

4. A follower and homing switch comprising a rotary type master switch, a rotary type follower switch movable coaxially with said master switch, positioning mechanism providing a yieldable spring driving coupling between said switches and moved by switching movement of the master switch to determine homing positions for the follower switch, and releasable indexing means normally restraining following movement of the follower switch and releasable to permit the latter to home to index positions determined by said positioning means.

5. A follower and homing switch comprising a rotary step-by-step master switch, means for stepping said master switch, means for resetting the master switch to a starting position, a radially-projecting indexing lever rotatable coaxially of the rotative axis of, but independently of, the master switch, a follower positioning stud disposed radially of said axis on said indexing lever, a radial positioning lever rotatable with said master switch adjacent the indexing lever, a second radially-situated positioning stud on said positioning lever and normally aligned radially with said follower stud when both switches are in starting position, a pair of pawls each pivoted on the index lever on opposite sides of the turning axis of the master switch, said pawls flanking said studs when the latter are in normally aligned starting position, spring means yieldingly urging said pawls convergently into flanking engagement with said studs in starting position, and releasable indexing means normally restraining movement of said indexing lever, said master switch upon movement from starting position moving said positioning lever and its stud to a homing position and thereby moving one of said pawls to tension said spring means to urge the other pawl against the index lever stud and thereby urge the index lever to follow the positioning lever, the index lever being freed for such following movement to a homing position determined by the position of said positioning lever and stud responsive to release of the indexing means, and a follower switch positioned by said index lever.

6. A follower switch for use in combination with an ancillary circuit in which a variety of control conditions exist, a cycling switch and means for initiating a cycle of operation thereof, a master switch including electrical actuating means in a circuit controlled by said cycling switch and actuated in advance and resetting movements by the cycling switch, a follower switch yieldingly coupled with the master switch and tending to follow the master switch, releasable index means including detent means cooperable with said follower switch and normally restraining following movement of the follower switch, means actuated under control of the cycling switch following each resetting and advancing operation of the master switch thereby for releasing said index means, and circuit connections set up by said follower switch dedependently upon one or another of said circuit conditions existing in the ancillary circuit for determining the degree of advance of said master switch under control of said cycling switch in a subsequent cycle of operation of the latter.

7. A follower switch control unit comprising a rotary-stepping type master switch, a rotary type cycling switch, a rotary type follower switch yieldingly coupled with said master switch to follow the latter when unrestrained, electrically releasable index means normally restraining following movements of said follower switch, a plurality of contactors moved by said follower switch relative to follower control contacts; a plurality of contactors moved by said master switch relative to master contacts, circuit means for initiating and concluding an operating cycle for said cycling switch, circuit and resetting means controlled by said cycling switch for resetting said master switch from an advanced to a starting position; circuit means controlled by said cycling switch and certain master switch contactor and contact means, and a first follower-switch contactor and follower switch contacts, dependently upon a first condition in an ancillary circuit, for moving the master switch from starting to a predetermined advanced position, position-determining means moved by the master switch to determine a homing position for the follower switch when indexed, index releasing means actuated by the cycling switch at a time during each operating cycle thereof, to free said master switch for following movement to said homing position, and circuit connections controlled by a second follower switch contactor and follower switch contacts, and dependent upon a second condition in said ancillary circuit for determining the number of steps to be taken by said master switch in a subsequent operation initiated by said cycling switch, and general control contact means moved by the master switch and adapted for connection with a controlled instrumentality.

8. A follower switch control unit comprising a cycling switch and switch controlled means for cycling same, a rotary type master switch and electrical advancing and resetting means therefor, both actuated under control of said cycling switch during each operating cycle thereof, a follower switch yieldingly coupled with said master switch to follow the advance and reset movements thereof when not restrained, releasable index means normally restraining following movement of said follower switch, and electromagnetic means actuated under control of said cycling switch during each operating cycle for releasing said index means, together with circuit connections controlled jointly by said master and follower switch and predetermined ancillary subcircuit conditions for predetermining the advance movements of the master switch under control of the follower switch, dependently upon said conditions in any operating cycle of the cycling switch.

9. A score control switch device for use in a game having a plurality of score switches all, or less than all, of which can be operated at different times in playing the game, said device comprising: a cycle switch and means actuated by a playing piece for cycling same; a multi-position master switch, and electrically controlled positioning means therefor, means actuated under control of said cycle switch during each operating cycle to actuate said positioning means for resetting said master switch and thereafter repositioning same dependently upon circuit connections controlled by said game switches and whether all or less than all of said score switches have been operated at a time preceding any operation of the cycle switch, a follower switch including at least two multi-position contactors and contacts therefor, relay circuit means operated under control of said score switches in a first condition when less than all said score switches are operated, and in a second condition when all score switches are operated, said relay circuit means in first condition connecting a first one of said contactors in a movement-controlling positioning means of the circuit for the master switch, and in its second condition connecting the second said contactor in said movement-controlling circuit, homing means yieldingly intercoupling said following switch contactors for movement to follow movements of said master switch, electrically releasable holding means for said follower contactors normally preventing following movement thereof, circuit connections controlled by said cycle switch for releasing said holding means following any respositioning of said master switch thereby, and circuit connections controlled by said follower switch contactors and associated contacts, said relay circuit means, and said master switch, for predetermining the repositioning movements of the master switch, as to position, by the cycle switch according to a predetermined pattern and dependently upon whether said relay circuit means is in the the first or second of said conditions.

10. In a game control circuit, a rotary master switch, a rotary type follower switch, homing mechanism yieldingly coupling the follower switch to follow the master switch, releasable index means normally holding the follower switch against following movement, a plurality of game switches, electrically operated actuating mechanism and a first circuit means for actuating the master switch and releasably indexing the follower switch, and additional circuit connections established by predetermined operations of said game switches, said master switch and said follower switch to control said actuating mechanism and thereby the movements of the master switch by indexing of the follower switch dependently upon the actuation of said game switches.

11. A follower switch comprising a master switch having a shaft, a contactor moveable by said shaft, master contacts engaged variously by said contactor in different angular positions thereof, means for turning said shaft in opposite directions, a positioning member moved into different angular positions by said shaft, a rotatively movable follower contact means and follower contacts variously engageable thereby in different angular positions thereof; coupling means cooperable with said positioning member to provide a yieldable driving connection between said shaft and said follower contactor and tending to turn the latter in either direction responsive to corresponding turning of said shaft and positioning member, an indexing ratchet movable in step with said follower contactor, releasable detent means engageable with said ratchet to hold follower contact at any of a plurality of indexed positions, and means for moving said detent into and out of operative engagement with said ratchet, said follower contactor being urged to move by said coupling means responsive to release of said detent means, to follow said master contactor to predetermined indexing positions determined by the angular position of the said positioning member.

12. In a follower type homing switch, a rotatable, multi-position master contactor and shaft means for rotating the same, a follower contactor floating on said shaft, a positioning member rotatively movable with said shaft means, a spring coupling means drivingly interconnecting said follower and master contactors through turning effort transmitted from said positioning lever to said spring coupling means responsive to angular movement of said shaft means, indexing means releasably restraining said follower contactor against rotative movement, and contacts respectively engageable by said master and follower contactors in different angular positions thereof.

13. In a switch according to claim 12, the further provision of electrical actuating means for selectively moving said shaft means in opposite directions, electrically actuated release means for said indexing means, and main control switch means for selectively operating said actuating means for moving the shaft means in either direction, and thereafter actuating said release means to cause the follower contactor to follow the master contactor accordingly and be indexed in a corresponding position, and for thereafter again energizing said actuating means under circuit connections with said main control switch means and determined by said follower switch contactor and associated contacts in said indexed position to reposition said master contactor to any of a plurality of positions each determined by the particular position in which the follower contactor has been indexed as aforesaid.

14. In a rotary type multi-position switch structure, coaxially turning master and follower contact means; angularly spaced contacts respectively engaged by said contact means in the various angular positions thereof; means for turning the master contact means into desired angular positions; a positioning lever turned with the master contact means and including a radially-situated member, a pair of coupling members both mounted to move with said follower contact means and to project in a radial sense into positions respectively flanking said radial member on the positioning lever to be drivingly engaged by the said member, each said coupling member being movable also relative to said follower contact means toward and away from said radial member on the positioning lever; spring means normally urging said flanking coupling members convergently toward said radial member for driving cooperation therewith, such that when said positioning lever is moved angularly with the master contact means in either direction, one or the other of said coupling members will be urged by said radial member to urge the follower contact means in the same direction; and releasable holding means for selectively holding or freeing the follower contact means in turning movements under urgence by the positioning lever as aforesaid, such that the follower contact means may follow movements of the master contact means at once if the holding means is released at the time the master contact means moves, or subsequently to such movement at such time as the holding means is released after the master contact means is moved.

15. In a rotary type multi-position switch, rotatively movable master contact means; rotatively movable follower contact means; a yieldable driving connection between said master and follower contact means such that the same tend to turn together but one said contact means may be held while the other turns; means for selectively holding or freeing one of said contact means; means for turning the other said contact means, said driving connection including spring means acting to urge the held contact means to turn in the same direction as the turned contact means and to follow the latter into a certain indexed position corresponding to each position into which the same is turned; and circuit-contacts engaged variously by said master and follower contact means in the various positions into which the same are turned as aforesaid.

16. A follower and repositioning switch of the rotary stepping type comprising coaxially rotatable master and follower contacts, electromagnetically operated means for stepping the master contact to desired advance positions and restoring it to a starting position; means positively following the movements of the master contact for yieldingly urging the follower contact in the same direction to lodge in predetermined corresponding index positions to control a subsequent repositioning of the master contact by said electro-magnetically operated means; electrically controlled holding means normally restraining following movements of the follower contact, and circuit connections for operating said electro-magnetically operated means and said electrically controlled holding means in a sequence to advance the master contact, then release said holding means to index the follower contact, and thereafter restore said master contact to said starting position, and again advance said master contact to a different advanced position, said last-mentioned circuit connections including electrically-operated sequence switch means follower contacts in the respective advanced starting and indexed positions thereof as aforesaid; together with additional switch means for actuating said sequence switch means for the purposes aforesaid.

17. A follower switch control unit for operation responsive to different predetermined circuit conditions in an ancillary control circuit, said unit including: a cycle switch and means for cycling same, a master switch including a resettable and advancedly movable contact means and means for advancing and resetting same, a follower switch having at least two follower contactors and at least two sets of follower contacts each respectively engaged by one of said follower contactors, homing mechanism yieldably coupling said follower contactors with said master switch contact means such that the latter tend to follow all movements of said master switch contact means, and electrically releasable index means cooperable with said follower contactors normally preventing following movement of said follower switch contactors, circuit connections effectuated by said follower switch and said cycle switch during each operating cycle thereof for actuating said resetting means of said master switch, and thereafter actuating said advancing means for the latter various numbers of steps determined by the position of at least one of said follower switch contactors relative to its corresponding follower contacts, said cycle switch thereafter operating to effect circuit connections to releasably actuate said index means and effect homing of the follower switch, together with variant circuit connections selectively established by said ancillary control circuit to one or another of said follower contactors, dependently upon which of said predetermined conditions exists during any cycle of the cycle switch, for varying the number of steps to be taken by the master switch, as aforesaid, during a said cycle.

18. A follower switch control device for use with an ancillary control circuit in which one or another of at least two predetermined circuit conditions, A or B, can exist, said device including, to wit: a cycle switch and circuit means operable to cycle the same, a multi-position master switch including contact means adapted to be advanced and reset, electrical advancing and resetting means for said master switch, repositioning circuit means actuated by said cycle switch to actuate said advancing and resetting means to reset and advancingly reposition the master switch in each cycling aforesaid, a follower switch including at least an A contactor and a B contactor and respectively associated follower contacts therefor, homing mechanism yieldingly coupling said A and B contactors with said master switch contact means to follow movements of the latter, electrically releasable indexing means normally holding said A and B contactors against following movement and releasingly actuated once per cycle by said cycle switch to index said contactors, and circuit connections controlled jointly by said master switch contact means and one or more of said A or B contacts connected in said repositioning circuit for the master switch dependently upon which of the A or B conditions exists in said ancillary circuit during an operating cycle of the cycle switch, for determining the degree of advance of the master switch in a repositioning thereof which follows an indexing of the follower switch.

DONALD E. HOOKER.
FRANK G. NICOLAUS.

References Cited in the file of this patent
UNITED STATES PATENTS

| Number | Name | Date |
|---|---|---|
| 2,247,059 | Johnson | June 24, 1941 |
| 2,254,619 | Meyer | Sept. 2, 1941 |
| 2,477,953 | Berthiez | Aug. 2, 1949 |

FOREIGN PATENTS

| Number | Country | Date |
|---|---|---|
| 781,489 | France | Feb. 25, 1935 |